United States Patent [19]

Hogden, Sr. et al.

[11] Patent Number: 4,645,253

[45] Date of Patent: Feb. 24, 1987

[54] FISH GRIPPING DEVICE

[75] Inventors: John D. Hogden, Sr., Tyler, Tex.; Charles M. Clelland, Kalamazoo, Mich.

[73] Assignee: HoPeC Enterprises, Inc., Tyler, Tex.

[21] Appl. No.: 826,821

[22] Filed: Feb. 6, 1986

[51] Int. Cl.⁴ ............................................. A01K 97/14
[52] U.S. Cl. ..................... 294/19.1; 294/26; 294/103.1
[58] Field of Search .............. 294/11, 19.1, 19.3, 294/26, 50.9, 61, 66.1, 103.1, 104; 43/5, 53.5, 54.1; 81/420

[56] References Cited

U.S. PATENT DOCUMENTS

| | | | |
|---|---|---|---|
| 2,155,913 | 4/1939 | Thompson et al. | 294/19.3 |
| 2,570,538 | 10/1951 | Fincher et al. | 294/26 |
| 2,583,476 | 1/1952 | Davidson | 294/103.1 |
| 3,001,320 | 9/1961 | Sonner | 294/103.1 X |
| 3,287,845 | 11/1966 | Smith | 294/61 X |
| 3,844,599 | 10/1974 | Burian | 294/104 X |
| 4,148,512 | 4/1979 | Pendlebury | 294/26 |
| 4,559,853 | 12/1985 | Oye | 81/420 |

FOREIGN PATENT DOCUMENTS

510094   2/1955   Canada ...................... 43/5

Primary Examiner—Johnny D. Cherry
Attorney, Agent, or Firm—Flynn, Thiel, Boutell & Tanis

[57] ABSTRACT

A device for releasably gripping a fish includes a support member, an operating member movably supported on the support member, first and second gripping elements supported for movement relative to each other between positions in which they are spaced and adjacent, and an arrangement for effecting relative movement of the gripping elements in response to relative movement of the operating member and support member. The first and second gripping elements are respectively adapted to be placed inside the mouth of a fish and against an outer surface of the lower jaw of the fish when in a position spaced from each other, subsequent movement of the gripping elements toward each other causing the lower jaw of the fish to be firmly releasably gripped by the gripping elements.

3 Claims, 10 Drawing Figures

FISH GRIPPING DEVICE

FIELD OF THE INVENTION

This invention relates to a device for releasably gripping a fish and, more particularly, to a device which a fisherman can use to releasably grip the lower jaw of a fish on opposite sides thereof while removing a hook from the mouth of the fish.

BACKGROUND OF THE INVENTION

In the sport of light tackle fishing for fresh water and salt water fish, it is important that the fisherman be able to remove his hook from the mouth of the fish without harm to the fish or himself, particularly where he does not intend to keep the fish. It has been found that by placing the thumb of one hand in the mouth of the fish and the index finger of that hand against the outside of the lower jaw of the fish, and then pressing the lower jaw of the fish away from the upper jaw with the thumb, the fish becomes temporarily paralyzed or at least makes little or no attempt to struggle, thereby permitting the fish to be securely held while the hook is removed from its mouth. While this approach is generally satisfactory, it does have some disadvantages.

First, the fish may lunge when the fisherman's hand first touches it and thereby cause the hook to be rammed into the hand of the fisherman. Second, placing the thumb in the mouth of the fish is acceptable in the case of fish with no significant teeth, such as the black (large mouth) bass, Kentucky (small mouth) bass, sand bass, and stripers, but is not suitable for use with fish having pronounced teeth, including the pike, walleye, muskie, salt water speckled trout and many other sport fish. Third, manually grasping the fish may cause damage to the scales and/or may remove a portion of the protective coating on the fish, which in the case of some species may result in the growth of a fungus on the fish which can ultimately kill the fish. Finally, some fishermen prefer not to directly touch the fish at all, much less place a thumb inside the mouth of the fish. Further, winter fishermen like to avoid removing their gloves because of the cold weather.

Accordingly, it is an object of the present invention to provide a device which can be used to releasably and securely grip a fish in a manner minimizing movement of the fish while a hook is removed from the mouth of the fish, and which can be used equally well with fish having teeth and fish lacking teeth.

It is a further object of the invention to provide a device which can securely and releasably grip a fish in a manner which ensures that little or no harm will be experienced by the fish or the fisherman, and in particular which ensures that there will be little or no damage to the scales of the fish and that there will be little or no removal of the protective coating on the fish.

It is a further object of the invention to provide a device which avoids the need for the fisherman to ever directly touch the fish and, in particular, which can be moved into gripping contact with the fish when the fish is dangling from the hook and line under rod tension with most of its body still in the water.

It is a further object of the present invention to provide a fish gripping device of the aforesaid type which is compact, lightweight, structurally simple, easy and inexpensive to manufacture and assemble, and requires little or no maintenance.

SUMMARY OF THE INVENTION

The objects of the invention, including those set forth above, are met by providing a device for releasably gripping a fish which includes a support member, an operating member supported on the support member for movement between first and second positions, first and second gripping elements supported for movement relative to each other between a released position spaced from each other and a gripping position adjacent each other, and an arrangement for effecting movement of the gripping elements between the released and gripping positions in response to movement of the operating member and support member between their first and second positions, the first and second gripping elements respectively being adapted to be placed inside the mouth of a fish and against an outer surface of the lower jaw of the fish when in the released position, subsequent movement of the gripping elements from the released position to the gripping position in response to relative movement of the operating member and support member from the first position to the second position causing the lower jaw of the fish to be firmly releasably gripped by the gripping elements.

BRIEF DESCRIPTION OF THE DRAWINGS

Several preferred embodiments of the inventive fish gripping device will be described hereinafter with reference to the accompanying drawings, in which.

DETAILED DESCRIPTION

Figures 1, 2:
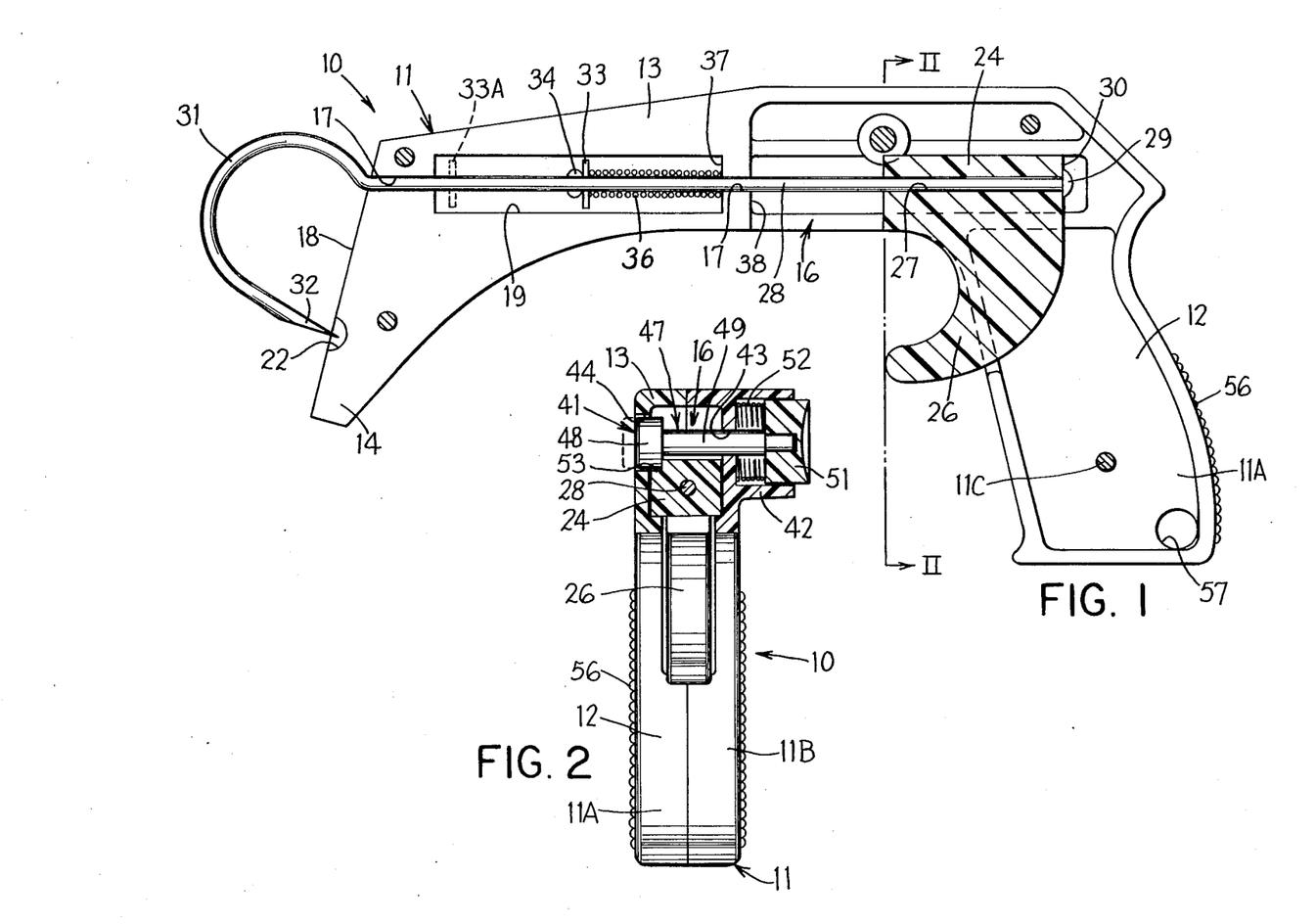
FIG. 1 is a sectional side view of a fish gripping device embodying the present invention.
FIG. 2 is a sectional view taken along the line II—II in FIG. 1.

A first embodiment of the inventive fish gripping device is shown in FIGS. 1 and 2 and designated generally by reference numeral 10. The device 10 includes a support member 11 which is made of plastic and includes two halves 11A and 11B which are secured together in a conventional manner by rivets or screws 11C. The support member 11 includes a vertically extending handle portion 12 and an extension 13 which extends horizontally outwardly from the upper end of the handle portion 12 and has at its outer end a downward projection 14. The support member 11 has an opening 16 extending thereinto at the intersection of the handle portion 12 and extension 13, and has a cylindrical passage 17 which extends horizontally through the extension 13 and opens through a planar gripping surface 18, the surface 18 facing away from and being provided on the end of the extension 13 remote from the handle 12. The passage 17 includes between its ends a portion 19 of enlarged diameter which serves as a cylindrical chamber within the extension 13. The surface 18 has a hemispherical or semicylindrical recess 22 therein at a location spaced below the passage 17. The surface 18 slopes downwardly and forwardly at an angle of approximately 75° relative to the axis of the passage 17.

A plastic operating member 24 is provided in the opening 16 in the support member 11 and is reciprocally movable therein in directions parallel to the passage 17. The operating member 24 has a trigger portion 26 which can be manually pulled by an index finger of a hand gripping the handle portion 12 of the support member 11 so as to effect rightward movement of the operating member 24 in FIG. 1. The operating member 24 has a cylindrical passage 27 therethrough which is coaxially aligned with the passage 17.

The operating member 24 is supported on an elongate cylindrical rod 28 which extends snugly through the passage 27 in the operating member 24 and extends axially slidably through the passage 17 in the support member 11. The right end of the rod 28 in FIG. 1 has a head 29 which is disposed against an end surface 30 of the operating member 24, and the opposite end of the rod 28 is bent to form a generally semicircular gripping hook 31 having a pointed end 32 which can move into and out of the recess 22 in the surface 18 in response to axial movement of the rod 28 within the passage 17. An annular washer 33 encircles the rod 28 within the chamber 19, and is held against leftward movement relative to the rod 28 in FIG. 1 by a weld bead or upset staking 34 provided on the rod 28. The washer 33 serves as an abutment for one end of a helical spring 36 which encircles the rod 28 within the chamber 19, one end of the spring 36 being supported on the washer 33 and the other end of the spring 36 being supported on an end surface 37 of the chamber 19. The spring 36 yieldably urges the rod 28 and operating member 24 leftwardly from the position shown in FIG. 1 to a position in which the operating member 24 is engaging an end surface 38 of the opening 16 in the support member 11, in which the spring abutment 33 is at the position shown in broken lines at 33A, and in which the pointed end 32 of the hook 31 is spaced leftwardly from the recess 22 provided in the surface 18 on the support member 11.

A locking arrangement 41 (FIG. 2) is provided to releasably hold the operating member 24 and rod 28 in the position shown in FIG. 1. The locking arrangement 41 includes a cylindrical flange 42 projecting transversely outwardly from the part 11B of the support member 11, a transverse opening 43 through the part 11B concentric with and of lesser diameter than the cylindrical flange 42, and a transverse opening 44 through the part 11A, the opening 44 having a diameter larger than and being coaxial with the opening 43. A plastic pin 47 has a cylindrical head 48 which is axially movable within and has a slightly smaller diameter than the opening 44, and has a cylindrical shank 49 which extends through the opening 16 above the operating member 24 and through the opening 43, and is fixedly secured in a cylindrical opening provided in a plastic release or operating button 51 which is axially movable within and has an outside diameter slightly less than the inside diameter of the cylindrical flange 42. The diameter of the shank 49 is slightly less than that of the opening 43. A helical spring 52 encircles the shank 49 of the pin 47 within the cylindrical flange 42 and has its ends disposed against the operating button 51 and the support member 11 so as to yieldably urge the pin 47 and button 51 rightwardly in FIG. 2 toward a locking position which is shown in solid lines. In the locking position, a portion of the head 48 of the pin 47 projects into the opening 16 in the support member 11 and engages a somewhat sector-shaped recess 53 provided in a side surface of the operating member 24 when the operating member is in the position shown in FIG. 1, thereby preventing leftward movement of the operating member 24 in FIG. 1 in response to the urging of the spring 36. When the release button 51 is manually pressed, the head 48 of the pin 47 is moved leftwardly in FIG. 2 to the position shown in broken lines, in which it is free of engagement with the recess 53 in the operating member 24 and the operating member 24 is thus free to move leftwardly in FIG. 1 under the urging of the spring 36. When the button 51 is released, the spring 52 causes the head 48 of the pin 47 to slidably engage a side surface of the operating member 24 until the recess 53 again becomes aligned with the head 48 so that the spring 52 can move the head 48 into the recess 53.

The handle portion 12 of the support member 11 has ribbing 56 thereon to facilitate a secure manual gripping of the handle portion 12, and a transverse hole 57 is provided through the handle portion 12 so that the device 10 can be hung from a nail or pin for storage. Alternatively, the opening 57 can be used to tie a loop of cord to the device 10, the loop of cord being placed around the wrist of a user in order to avoid loss of the device 10 and a fish held with it in the event the device 10 is inadvertently dropped or released during use.

The device 10 of FIG. 1 is operated in the following manner. When a fisherman has caught a fish and wishes to use the device 10 to hold the fish while he disengages his hook from the mouth of the fish, he manually grips the handle portion 12 and then uses his thumb to manually press the release button 51 so as to move the head 48 of the pin 47 out of engagement with the recess 53 in the operating member 24, thereby permitting the spring 36 to move the operating member 24 and rod 28 leftwardly in FIG. 1 so that the pointed end 32 of the hook 31 is spaced outwardly from the recess 22 in the surface 18. The bottom of the lower jaw of the fish is then placed against the portion of the surface 18 having the recess 22 therein, so that the pointed end 32 of the hook 31 is disposed within the open mouth of the fish. This position of the fish is shown in broken lines at 58 in FIG. 9 in conjunction with a different embodiment of the inventive device. Still referring to FIGS. 1 and 2, the surface 18 and hook 31 are oriented relative to the handle 12 so that the fisherman can easily position the device 10 correctly with respect to the fish while holding his fishing rod so that the fish is dangling from the hook with most of its body still in the water, thereby avoiding the need for the fisherman to manually grasp the fish itself. After the device 10 is correctly positioned with respect to the fish, the fisherman uses his index finger to squeeze the trigger portion 26 of the operating member 24, so that the operating member 24 and rod 28 move rightwardly in FIG. 1 against the urging of the spring 36, thereby moving the pointed end 32 of the hook 31 rightwardly in FIG. 1 so that the pointed end 32 presses the lower jaw of the fish against the surface 18. This causes the fish to be securely held and also tends to reduce or eliminate struggling movements of the fish while the fisherman disengages his hook. The fisherman then releases his grip on the trigger portion 26 of the operating member 24, so that the spring 36 moves the operating member 24, rod 28 and hook 31 leftwardly in FIG. 1. When the fish has been released from the device, the fisherman again squeezes the trigger portion 26 of the operating member 24 so that the operating member 24 moves to the position shown in FIG. 1. When the operating member 24 reaches this position, the urging of the spring 52 causes the head 48 of the pin 47 to snap into the recess 53 provided in the operating member 24, thereby releasably holding the operating member 24 in the position shown in FIG. 1. In this position, the pointed end 32 of the hook 31 is disposed within the recess 22 in the surface 18, thereby minimizing the chance of injury to the fisherman from the pointed end 32 when the device is not being used.

Figure 3:
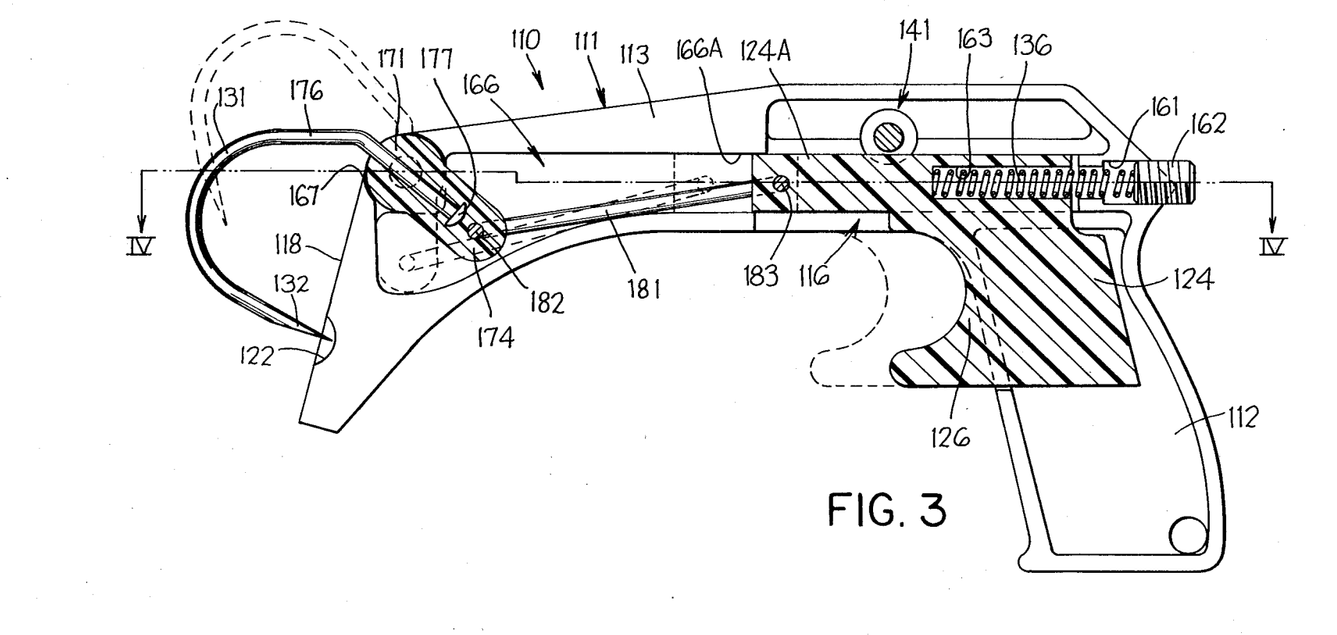
FIG. 3 is a sectional side view of an alternative embodiment of the device of FIG. 1.
Figure 4:
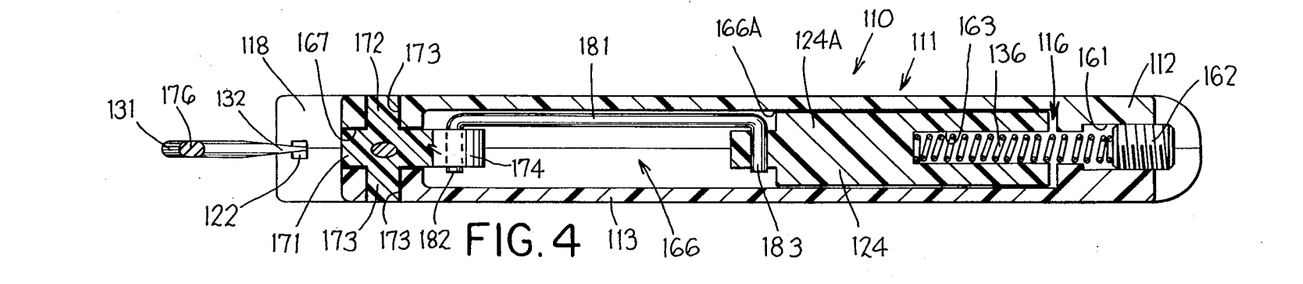
FIG. 4 is a sectional view taken along the line IV—IV in FIG. 3.

An alternative embodiment of the inventive fish gripping device is shown in FIGS. 3 and 4 and is designated generally by reference numeral 110. The device 110 is structurally similar in many respects to the device 10 of FIGS. 1 and 2. In particular, the device 110 includes a support member 111 which includes a handle portion 112 and an extension 113, the support member 111 having an opening 116 in the region of the intersection of the handle portion 112 and extension 113 and having at the outer end of the extension 113 a gripping surface 118 having a recess 122 therein. An operating member 124 is movably supported in the opening 116 and has a trigger portion 126 which can be engaged by the index finger of a hand manually grasping the handle portion 112. The device 110 includes a gripping hook 131 which can be pivoted between positions shown in solid and broken lines in FIG. 3, a pointed end 132 of the hook 131 being disposed in the recess 122 in the position shown in solid lines. A helical spring 136 is provided to yieldably urge the operating member 124 leftwardly in FIGS. 3 and 4, and a locking arrangement 141, which is preferably substantially identical to the locking arrangement 41 of FIGS. 1 and 2, is provided to releasably hold the operating member 124 in the position shown in FIGS. 3 and 4. The following paragraphs discuss in detail the structural features of the device 110 which differ from the device 10 of FIGS. 1 and 2.

More specifically, the device 110 includes at the upper end of the handle portion 112 a cylindrical opening 161 which extends approximately parallel to the extension 113, communicates with the opening 116 and is threaded at its outer end, and a threaded screw stud 162 which is threadably engaged in the outer end of the opening 161. The operating member 124 has a cylindrical opening 163 therein which is coaxial with the opening 161, the spring 136 being disposed in the openings 163 and 161 and having one end disposed against the inner end of the opening 163 and its other end disposed against the inner end of the threaded stud 162. Rotation of the threaded stud 162 permits the initial tension of the spring 136 to be changed, and the spring 136 can if necessary be easily replaced by removing the stud 162.

The support member 111 has a chamber or passage 166 which extends from the opening 116 to a location a small distance behind the surface 118, and a hole 167 in the upper end of the surface 118 opens into the chamber 166. The chamber 166 has a portion 166A of rectangular cross-section which slidably supports a rectangular projection 124A of the operating member 124. A plastic hook support member 171 is disposed in the opening 167 and is pivotally supported there by transversely extending cylindrical pins 172 on opposite sides thereof which are each rotatably supported in transverse cylindrical openings 173 provided in the support member 111 on opposite sides of the opening 167. The hook support member 171 has a projection 174 which extends into the chamber 166 in a direction radially outwardly of the pins 172. A metal rod 176 has an end portion and a head 177 which are fixedly anchored in the hook support member 171, preferably by having the hook support member 171 injection molded therearound, and the remainder of the rod 176 is bent to form the hook 131 having the pointed end 132.

A link rod 181 is provided within the chamber 166 and has portions 182 and 183 at opposite ends thereof which are each bent to extend parallel to each other and at a right angle to the center portion of the rod 181, the end portion 182 being rotatably received in a transversely extending opening provided in the projection 174 at a location spaced radially outwardly from the pins 172, and the end portion 183 being rotatably received in a transversely extending opening provided in the projecting portion 124A of the operating member 124. When the operating member 124 moves between the positions shown in solid and broken lines in FIG. 3, the rod 181 is moved approximately axially between the positions shown in solid and broken lines and causes the hook support member 171 to pivot about the pins 172 so that the hook 131 moves between the positions shown in solid and broken lines.

The device 110 is operated in a manner identical to that described above for the device 10 of FIGS. 1 and 2, and operation of the device 110 is therefore not described here in detail.

Figures 5, 6:
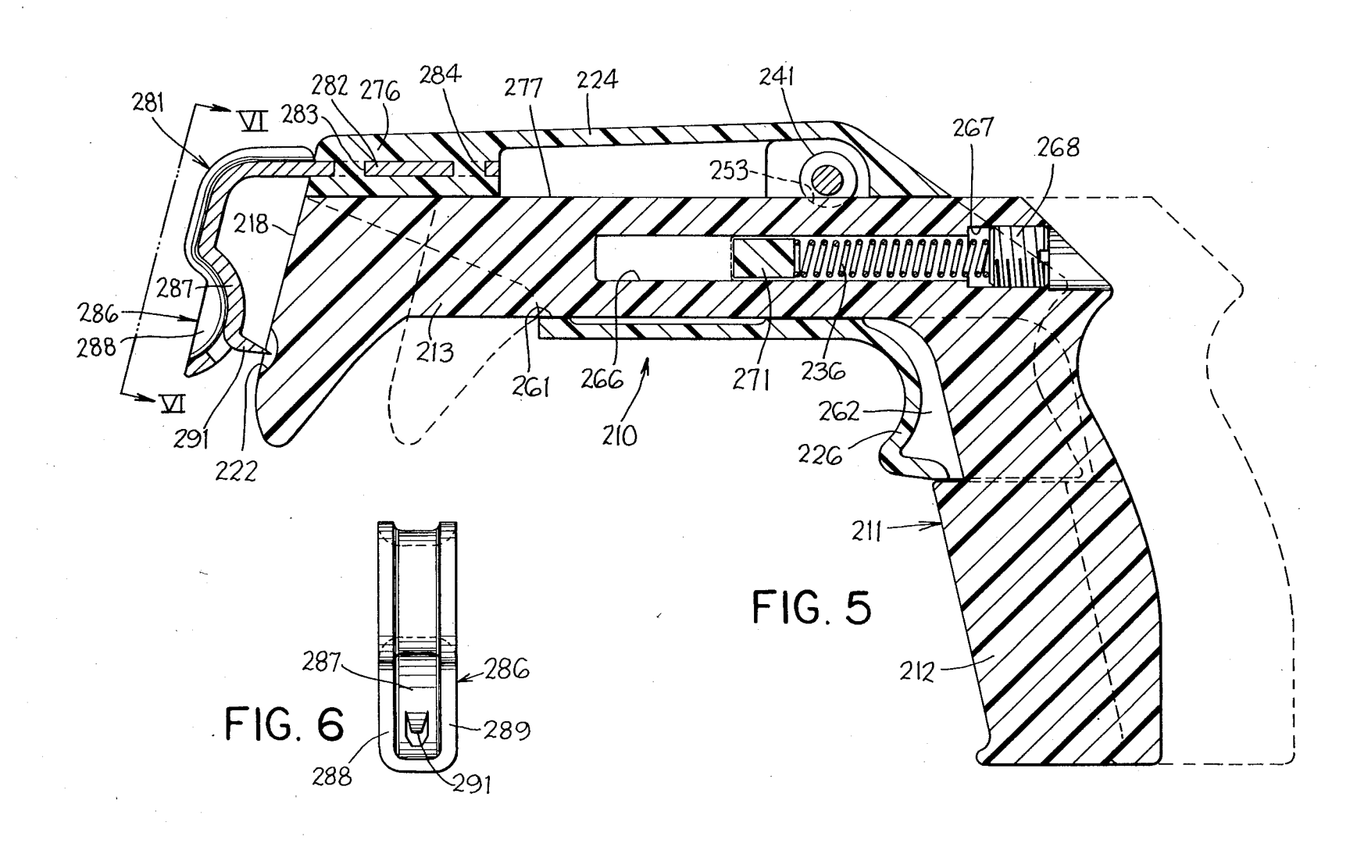
FIG. 5 is a sectional side view of another alternative embodiment of the inventive fish gripping device of FIG. 1.
FIG. 6 is an elevational view of a gripping element which is a component of the device of FIG. 5, FIG. 6 being taken in the direction of the arrows VI—VI in FIG. 5.

A further embodiment of the fish gripping device according to the invention is illustrated in FIGS. 5 and 6 and designated generally by reference numeral 210. The device 210 is also structurally similar to the device 10 of FIG. 1 in certain respects. In particular, it includes a support member 211 having a handle portion 212 and an extension 213 which projects forwardly from the upper end of the handle portion 212. The extension 213 has at the end thereof remote from the handle portion 212 a forwardly facing gripping surface 218 having a recess 222 therein. An operating member 224 is movably supported on the support member 211 and has a trigger portion 226 which can be engaged by the index finger of a hand manually gripping the handle portion 212 of the support member 211. A helical spring 236 is provided to resiliently urge the operating member 224 rightwardly in FIG. 5 relative to the support member 211, and a locking arrangement 241 is provided which can releasably secure the operating member 224 in its rightmost position relative to the support member 211. It should be noted that in the embodiment of FIG. 5 the locking arrangement 241 is provided on the operating member 224 and engages a recess 253 provided in the support member 211, whereas in the embodiment of FIG. 1 the locking arrangement 41 is provided on the support member and engages a recess in the operating member, but the structure and operation df the locking arrangements 41 and 241 are otherwise substantially identical, and a detailed discussion of the locking arrangement 241 is therefore unnecessary.

The important structural differences between the device 210 of FIGS. 5 and 6 and the device 10 of FIGS. 1 and 2 will now be described in detail. Referring to FIG. 5, the operating member 224 has an opening 261 which extends horizontally therethrough parallel to the direction of movement of the operating member 224 relative to the support member 211, the extension 213 of the support member 211 extending slidably through the opening 261 so that the operating member 224 is slidably supported on the extension 213. The operating member 224 has a curved wall defining the trigger portion 226, and two transversely spaced flanges 262 extend rearwardly from opposite sides of the trigger portion 226, the upper part of the handle portion 212 of the support member 211 being movably received between the flanges 262.

The support member 211 has an elongate slot 266 which opens through opposite side surfaces thereof and extends parallel to the direction of movement of the operating member 224 relative to the support member 211. The upper end of the handle portion 212 of the support member 211 has a threaded cylindrical opening 267 therein which is parallel to and opens into the slot 266 therein, and a screw stud 268 is threadably engaged in the opening 267. A crosspart 271 of rectangular cross section is fixedly secured to the operating member 224 and extends transversely through the slot 266 in the support member 211. The helical spring 236 is disposed in the slot 266 and opening 267, and has one end supported on the cross part 271 and its other end supported on the screw stud 268.

The operating member 224 has at the upper left end thereof in FIG. 5 a portion 276 which slidably engages the top surface 277 of the extension 213 adjacent the outer end of the extension 213. A gripping element 281 made of metal has a portion 282 which extends into the portion 276 of the operating member 224 and is anchored there by means of holes 283 and 284 therein which have been filled with the plastic material of the operating member 224, in particular by injection molding the portion 276 of the operating member 224 around the portion 282 of the gripping element 281. The gripping element 281 extends forwardly from the portion 276 of the operating member 224 and then extends downwardly and terminates in a semicylindrical portion 286 defined by a semicylindrical wall portion 287 and semicircular end walls 288 and 289. The semicylindrical portion 286 of the gripping element 281 is intended to have, on the side thereof facing the surface 218, a shape somewhat similar to that of a human thumb. A portion 291 of the semicylindrical wall 287 is bent to project outwardly toward the surface 218 and is sharpened to a point which can be received within the recess 222 in the surface 218. Movement of the operating member 224 relative to the support member 211 causes the gripping element 281 to move between a position in which the pointed portion 291 thereon extends into the recess 222, as shown in solid lines in FIG. 5, and a position in which the pointed portion 291 is spaced from the surface 218 and recess 222, as shown in broken lines in FIG. 5.

The device 210 is used to grip a fish in substantially the same manner described above with respect to the embodiment of FIGS. 1 and 2, and use of the device 210 is therefore not described here in detail.

Figure 7:
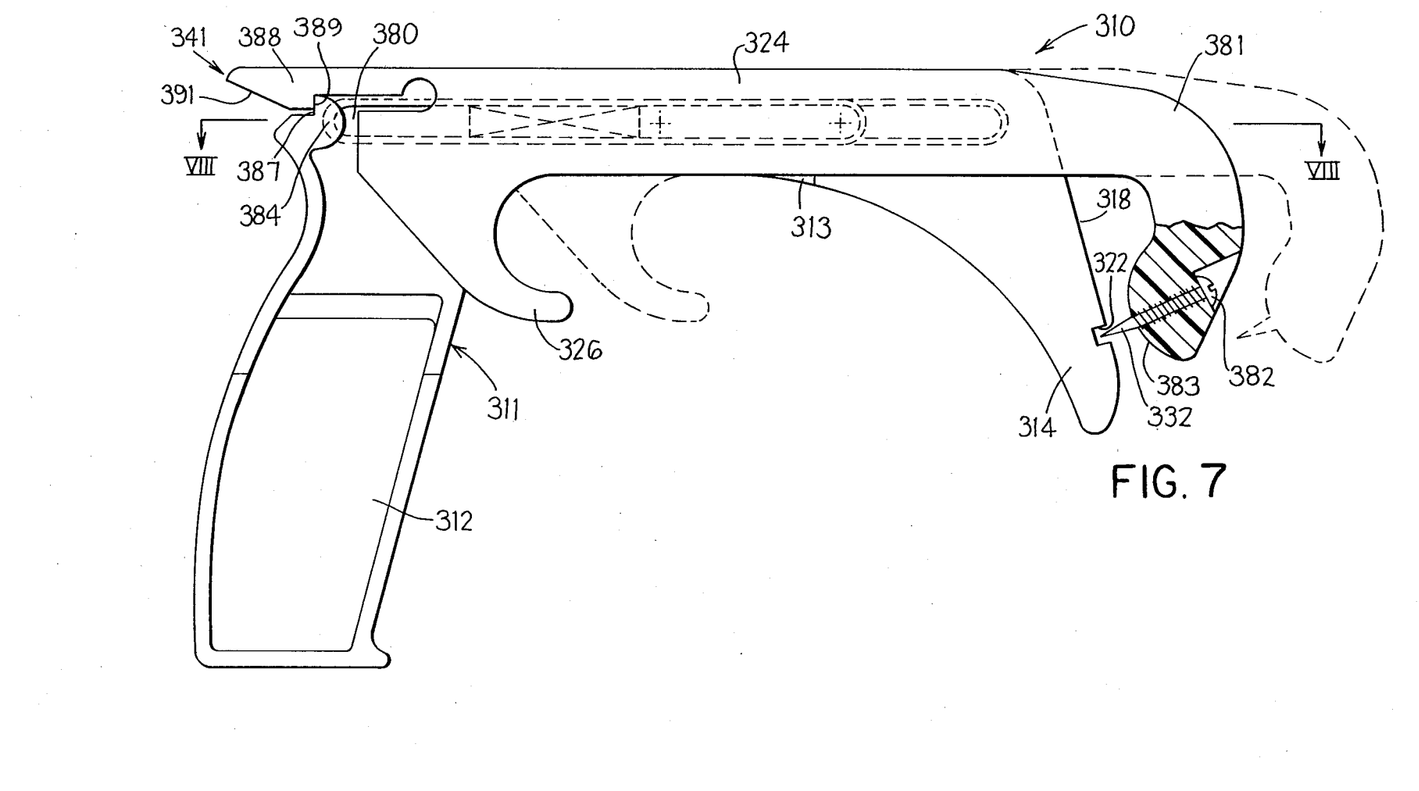
FIG. 7 is a fragmentary side view of an additional alternative embodiment of the device of FIG. 1.
Figure 8:
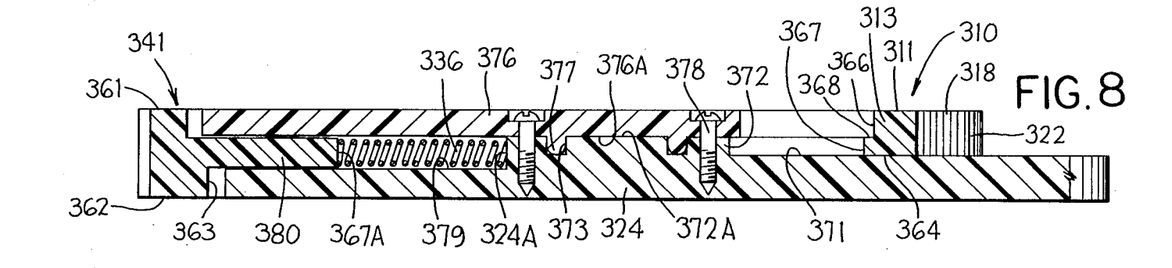
FIG. 8 is a sectional view taken along the line VIII—VIII in FIG. 7.

A further embodiment of the fish gripping device is illustrated in FIGS. 7 and 8 and designated generally by reference numeral 310. The device 310 is structurally similar in certain respects to the device of FIG. 1. In particular, it includes a support member 311 having a handle portion 312 and an extension 313 which extends forwardly from the upper end of the handle portion 312. The extension 313 has at the outer end thereof a downward projection 314 and has a gripping surface 318 thereon which in turn has a groovelike recess 322 therein. An operating member 324 is movably supported on the support member 311 and has a trigger portion 326 which can be manually engaged by a finger of a hand gripping the handle portion 312 of the support member 311. The operating member 324 has a projection with a pointed end 332 which moves between positions disposed in and spaced from the recess 322 in response to movement of the operating member 324 relative to the support member 311. A helical spring 336 urges the operating member 324 to move rightwardly in FIG. 7 relative to the support member 311, and a locking arrangement 341 is provided to releasably lock the operating member 324 and support member 311 against relative movement when they are in the position shown in solid lines in FIG. 7. The important structural differences between the embodiment of FIGS. 7 and 8 and the embodiment of FIG. 1 will now be explained.

The support member 311 has outer side surfaces 361 and 362 on opposite sides thereof, the side surface 362 having a large, shallow recess 363 therein which extends from the upper portion of the handle part 312 along the extension 313 to the outer end of the extension, 313, and the inner end of the recess 363 being defined by a large planar inner side surface 364 provided on the support member 311. The outer side surface 361 has therein an elongate groove 366 extending parallel to the direction of movement of the operating member 324 and having at the inner end thereof a planar inner side surface 368. An elongate slot 367 is provided in the extension 313 so as to extend parallel to the groove 366 and to open through the inner side surfaces 364 and 368, the slot 367 extending approximately three-fourths of the length of the groove 366 from a location near the right end of the groove 366, and having a width which is slightly less than the width of the groove 366, so that the surface 368 includes a narrow shoulder extending above and below the slot 367 and around the right end thereof in FIG. 7.

The operating member 324 has a planar side surface 371 thereon, which is slidably disposed against the planar inner side surface 364 of the support member 311, and has a projection 372 which is slidably received in the slot 367 and has two spaced recesses 373 therein, the projection 372 being elongated in a direction parallel to the slot 367 and having its outer end surface 372A approximately coplanar with the inner side surface 368 on the support member 311. An elongate retainer 376 is slidably disposed in the groove 366, has a planar surface 376A which slidably engages the side surface 368 on the support member 311, has two spaced projections 377 which protrude outwardly from surface 376A and are each disposed in a respective one of the recesses 373 in the operating member 324, and is securely connected to the operating member 324 by two screws 378. The retainer 376 has a width which is greater than the width of the slot 367 but less than the width of the groove 366, and has a length which is about three-fourths the length of the groove 366. The operating member 324 has in its side surface 371 an elongate groove 379 which extends leftwardly in FIG. 8 from a location adjacent the projection 372 and which is parallel to and vertically aligned with the slot 367 in the support member 311. The groove 379 slidably receives an elongate guide rail 380 which protrudes outwardly from the planar side surface 364 on the support member 311 and which extends leftwardly in FIG. 8 away from the left end 367A of the slot 367 parallel to the slot 367 and groove 379.

The helical spring 336 is disposed within the slot 367 and groove 379 between the operating member 324 and the retainer 376, and has its ends respectively supported against an end 367A of the slot 367 and a surface 324A provided on the operating member 324 at the left end of the projection 372.

The operating member 324 has at one end thereof a generally hook-shaped portion 381 which extends outwardly past the surface 318 and then downwardly, and has a generally semicircular surface 383 which faces the gripping surface 318. A screw 382 is fixedly secured in an opening which extends through the hook-shaped portion 381 from the surface 383, the screw 382 having a point which projects outwardly past the surface 383 and serves as the pointed projection 332.

The locking arrangement 341 includes a semi-circular boss 384 which is provided on the support member 311 at the upper rear portion thereof and has a rearwardly facing surface 387 thereon. The operating member 324 has a rearwardly extending flexible arm 388 thereon which is normally in the position shown in FIG. 7 but can be resiliently flexed upwardly from this position. The flexible arm 388 has a forwardly facing surface 389 thereon which can engage the surface 387 on the boss 384, as shown in FIG. 7, and has behind the surface 389 an upwardly and rearwardly inclined surface 391. When the surfaces 387 and 389 are in engagement, the operating member 324 is releasably held in the position shown in solid lines in FIG. 7, in which the pointed end 332 of the screw 382 is disposed in the recess 322.

When a fisherman is manually gripping the handle portion 312 of the support member 311, he can place his thumb on the rear end of the arm 388 and flex the arm 388 upwardly so that the surface 389 thereon moves out of engagement with the surface 387, the operating member 324 then moving forwardly under the urging of the spring 336. When the operating member 324 is ultimately returned to the position shown in solid lines in FIG. 7, the inclined surface 391 will engage the boss 384 and flex the arm 388 upwardly until the surface 389 thereon is just to the left of the surface 387 on the boss 384, and then the inherent resilience of the arm 388 will automatically cause it to move downwardly into the position shown in FIG. 7, in which the surfaces 387 and 389 are in engagement.

The device 310 is used to grip a fish in a manner substantially identical to that described above for the device 10 of FIGS. 1 and 2, and use of the device 310 is therefore not described here in detail.

Figures 9, 10:
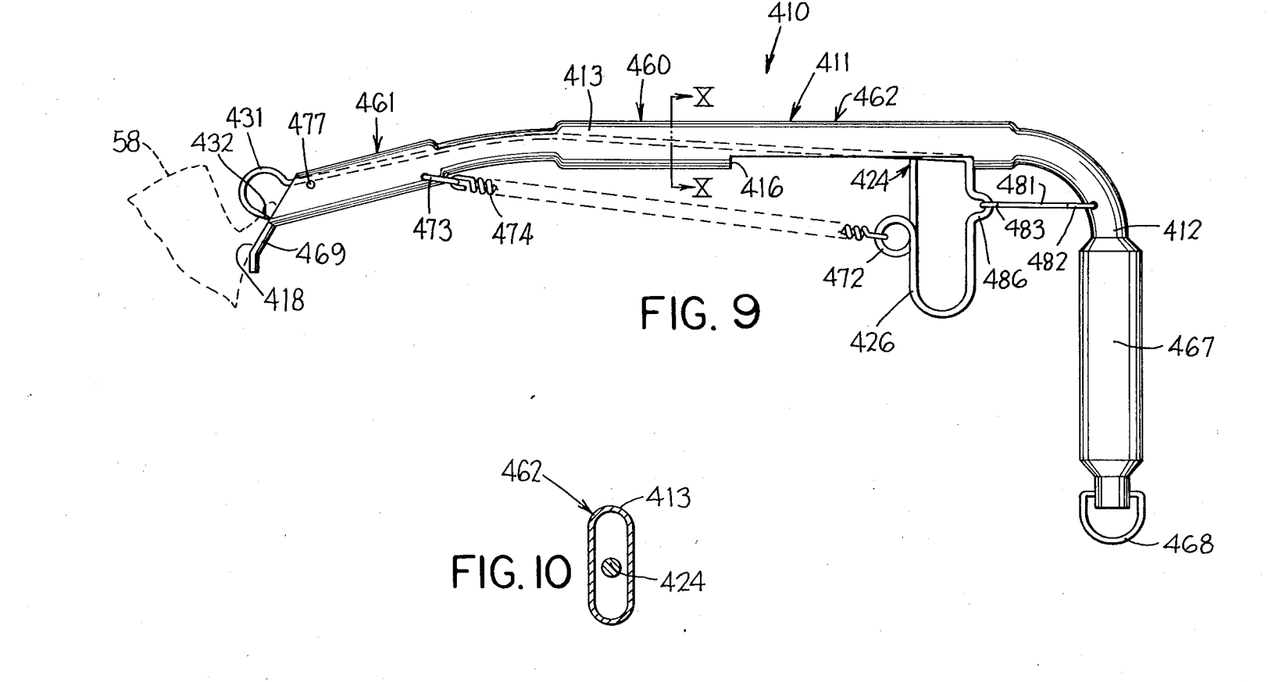
FIG. 9 is an elevational side view of a further alternative embodiment of the device of FIG. 1.
FIG. 10 is a sectional view taken along the line X—X in FIG. 9.

A further embodiment of the inventive fish gripping device is illustrated in FIGS. 9 and 10 and designated generally by reference numeral 410. The device 410 is structurally similar in certain respects to the embodiment of FIG. 1. In particular, it includes a support member 411 having a handle portion 412 and an extension 413 which extends forwardly from the upper end of the handle portion 412. The extension 413 has an opening 416 therein adjacent the intersection of the extension 413 and handle portion 412, and a forwardly facing gripping surface 418 is provided at the outer end of the extension 413. An operating member 424 is movably supported on the support member 411 and has a trigger portion 426 which can be manually engaged by fingers of a hand gripping the handle portion 412 of the support member 411. The operating member 424 has a gripping hook 431 thereon which terminates in a pointed end 432. The important structural differences between the embodiment of FIGS. 9 and 10 and the embodiment of FIG. 1 will now be discussed.

Referring to FIG. 9, the support member 411 is a round metal tube 460 which has been flattened somewhat at longitudinally spaced portions 461 and 462, the cross-sectional shape of the tube at portions 461 and 462 being that of a vertically oriented oval, as shown in FIG. 10. The opening 416 is an elongate slot which extends longitudinally of and is provided in the underside of the flattened portion 462 of the tube. The flattened portion 461 of the tube is located at the outer end of the extension 413. The portion of the extension 413 to the left of the flattened portion 462 is bent to extend downwardly and forwardly at a small angle relative to the flattened portion 462, as evident from FIG. 9. A sleevelike grip 467 encircles and is securely connected to the handle portion 412 of the support member 411 by an appropriate glue or other adhesive, and is preferably made of a material such as cork. A metal loop 468 is pivotally supported in openings at the lower end of the handle portion 412, and a metal plate 469 is welded to the outer end of the metal tube and has most of the surface 418 thereon, the end surface of the metal tube 460 being coplanar with the surface on the plate and thus a part of the surface 418.

The operating member 424 is an elongate cylindrical metal rod which extends slidably through the metal tube 460, is bent at its left end to define the hook 431 with the pointed end 432, and is bent at its right end to form a large loop which projects downwardly through the opening 416 and serves as the trigger portion 426, the trigger portion 426 including a small loop 472 on the front side thereof. A metal loop 473 extends through aligned openings in the flattened portion 461 of the tube, and a helical expansion spring 474 has its ends hooked on the loops 472 and 473 and yieldably urges the operating member 424 leftwardly relative to the support member 411.

A metal pin or rivet 477 is fixedly secured within and extends transversely across the flattened portion 461 of the metal tube 460 in an upper portion thereof adjacent the outer end of the extension 413. The metal rod which serves as the operating member 424 extends above and slidably engages the pin 477, and the pin 477 thus maintains this metal rod adjacent the top of the flattened portion 461, thereby keeping the hook 431 in a vertical position in which, when it is moved rightwardly to the position shown in FIG. 9, the pointed end 432 thereof will extend a small distance into the lower end of the flattened portion 461 of the tube 460.

A locking arrangement is provided to hold the operating member 424 and hook 431 in the positions shown in FIG. 9, and includes a metal wire 481 which has one end bent to form a loop 482 extending through openings in the tube 460 so as to movably support the wire 481 on the tube 460, and has its other end 483 bent to define a hook which can be releasably attached to a bent portion 486 of the trigger portion 426 when the operating member 424 is in the position shown in FIG. 9, the wire 481 then preventing the operating member 424 from moving leftwardly in FIG. 9 in response to the urging of the spring 474.

The device 410 of FIGS. 9 and 10 is used to grip a fish in substantially the same manner described above for the embodiment of FIG. 1. Accordingly, use of the embodiment of FIGS. 9 and 10 is not described here in detail.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for releasably gripping a fish, comprising: a support member, an operating member supported on said support member for movement between first and second position, first and second gripping elements supported for movement relative to each other between a released position spaced from each other and a gripping position adjacent each other, and means for effecting movement of said gripping elements between said released and gripping positions in response to movement of said operating member and support member between said first and second positions, respectively; wherein said first and second gripping elements are respectively adapted to be placed inside the mouth of a first and against an outer surface of the lower jaw of the fish when in said released position, subsequent movement of said gripping elements from said released position toward said gripping position in response to relative movement of said operating member and said support member from said first position toward said second position causing the lower jaw of the fish to be firmly releasably gripped by said gripping elements; wherein said support member includes a handle portion which extends in a first direction and can be manually gripped and an extension portion projecting outwardly from one end of said handle portion in a second direction transverse to said first direction; wherein said second gripping element in a gripping surface provided on an end of said extension portion remote from said handle portion and facing in a direction away from said handle portion; wherein said operating member has a trigger portion adapted to be engaged by a finger of a hand gripping said handle portion of said support member; including resilient means for yieldably urging relative movement of said operating member and said support member from said second position to said first position thereof; wherein said support member has planar first and second surfaces on opposite sides thereof which each extend parallel to said second direction, and has extending between said first and second side surfaces an elongate slot which extends parallel to said second direction, said operating member being slidably disposed against said first side surface; including a retaining member slidably supported against said second side surface of said support member and means which extends transversely slidably through said slot for fixedly coupling said retaining member and said operating member; and wherein said operating member includes a portion which projects outwardly past said gripping surface on said support member and which has a semicylindrical surface which faces said gripping surface on said support member, said operating member further having a pointed projection which extends outwardly from said semicylindrical surface in a direction toward said gripping surface on said support member, said semicylindrical surface and said pointed projection being said first gripping element.

2. The device according to claim 1, including locking means for releasably holding said operating member and said support member in said second position thereof, said locking means including said supporting member having thereon in the region of the intersection of said extension portion and said handle portion a first locking surface which faces in a direction approximately opposite that of said gripping surface, and includes said operating member having thereon a resiliently flexible arm which has at an outer end thereof a second locking surface which faces in a direction opposite to and can engage said first locking surface on said support member, and wherein when said operating member and said support member are in said second position said arm can be moved between positions in which said first and second locking surfaces are respectively engaging and spaced from each other, the inherent resilience of said flexible arm causes said outer end to move to the position in which said second locking surface thereon is engaging said first locking surface on said support member.

3. The device according to claim 2, wherein said resilient means includes a helical compression spring disposed in said slot, and extending approximately parallel to said second direction, having one end supported on said support member, and having its other end supported on said operating member; and wherein said pointed projection on said operating member is an end of a screw disposed in an opening which extends through said operating member from a location on said semicylindrical surface.

* * * * *